United States Patent

[11] 3,572,938

[72] Inventor James N. Bradford
 Falls Church, Va.
[21] Appl. No. 800,211
[22] Filed Feb. 18, 1969
[45] Patented Mar. 30, 1971
[73] Assignee The United States of America as represented by the Secretary of the Navy

[54] POLARIMETER
 5 Claims, 1 Drawing Fig.
[52] U.S. Cl. ................................................ 356/116,
 250/225, 356/119
[51] Int. Cl. .................................................... G01n 21/40
[50] Field of Search........................................ 356/114-
 —119, 90, 91, 92; 250/225

[56] References Cited
 UNITED STATES PATENTS
 2,865,246 12/1958 Pritchard...................... 356/92

Primary Examiner—Ronald L. Wibert
Assistant Examiner—J. Rothenberg
Attorneys—R. S. Sciascia and A. L. Branning ABSTRACT: A polarimeter devised to measure very small changes in the state of polarization of polarized light by the use of a prism which splits the incident light into two beams or light paths of orthogonal polarization, the intensity of each path being the intensity of that polarization component in the original beam. The polarimeter includes a differential measuring and recording system that compares the relative intensities in the two paths to determine the polarization of the incident light.

Patented March 30, 1971 3,572,938
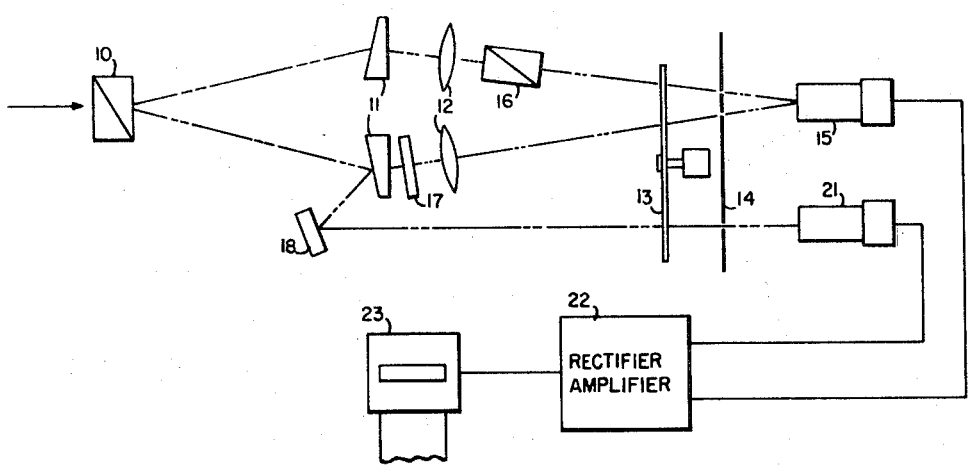
INVENTOR
JAMES N. BRADFORD
BY Melvin L. Crane AGENT
ATTORNEY

POLARIMETER

The invention described herein may be manufactured and used by or for the Government of the United States of America for governmental purposes without the payment of any royalties thereon or therefor.

BACKGROUND OF THE INVENTION

The advent of a number of optical devices and systems dependent on the atmospheric propagation of polarized light has brought about a need for a system to measure small changes in the state of polarization of polarized light. Previous polarimeters have depended on sequential observation of the incident light and the depolarized part by visual adjustment of an analyzer or compensator. Depolarization ratios have been formed from the results of direct measurements of depolarized light and total light. These characteristics combined with particular components and design features of prior-art devices often do not allow the full potential of the analyzer or compensator to be realized. Heretofore depolarization ratios smaller than $10^{15}$ have not been observed, although the extinction ratio, or transmittance, of the analyzer may be $10^{17}$ or less.

BRIEF SUMMARY OF THE INVENTION

This invention is directed to a smile sensitive linear polarimeter that includes a Wollaston prism which separates incident linearly polarized light into a reference path with polarization the same as that of the incident beam and a signal path containing any orthogonal component that may be present. The signal path is so named because it contains the orthogonal component to be measured. Suitable optical elements are provided to focus the light in each path through field stops onto the photocathode of a photomultiplier tube. The light of each path is directed through a rotating linear polarizer which modulates the signal and reference intensities alternately, (i.e., with opposite polarity or 180° relative phase) since they are polarized at right angles to each other. Due to modulation of the signal and reference intensities the photomultiplier tube generates a alternating component of current, also called signal or output signal whose amplitude and phase specify the difference between the reference intensity and the signal intensity. This difference current is converted to a DC voltage by a narrow-band amplifier and synchronous rectifier or a phase modulator. The DC output of the amplifier-rectifier is recorded onto a paper chart or any other suitable means by a recorder. Light reflected by a reference wedge in the reference beam is reflected by a mirror through the rotating polarizer to a second photomultiplier tube to produce a synchronization signal for the rectifier.

It is therefore an object of the invention to provide a simple polarimeter which is very sensitive to any polarization change in a polarized light source.

Another object is to provide a simple polarimeter which automatically records any polarization change in a polarized light source.

Yet another object is to measure small changes in the state of polarization of polarized light by use of electro-optical means.

Other and more specific objects of the invention will become apparent upon a careful consideration of the following detailed description when taken together with the accompanying drawing.

BRIEF DESCRIPTION OF THE DRAWING

The drawing is a diagrammatic illustration of the electro-optical system illustrating the various elements.

DETAILED DESCRIPTION OF THE DRAWING

Now referring to the drawing, there is shown a diagrammatic view of the system made in accordance with the teaching of this invention. Nominally polarized light incident on a Wollaston prism 10 passes through the Wollaston prism and is directed into two separate light paths, a signal path and a reference path. Each of the light paths include a glass wedge 11 which redirects the light in each path through a focusing lens 12. The focusing lens focuses the light through a rotating linear polarizer 13 which is positioned relative to the focusing lens such that the light from each, the signal and reference paths pass through the rotating linear polarizer, and through field stops 14 to a common point onto the photocathode of a phototube 15. The reference path includes a calibrated attenuator 17 between the glass wedge and the focusing lens to reduce the reference intensity to a level comparable to that of the signal beam. Some light is reflected by the glass wedge in the reference path onto a mirror 18 which redirects the reflected light incident thereon through the rotating polarizer 13 onto a lower phototube 21 to produce a synchronization signal for a rectifier-amplifier 22. The linear polarizer 16 is provided in the signal path to block reference path light reflected back to the signal path. The output signal from the phototube 15 is also directed to the rectifier amplifier where the signal is amplified and then directed to a chart recorder 23 for recording a line representative of the output signal. The output signal from the phototube 21 produces a synchronization signal for the rectifier and the alternating outputs of the upper phototube are amplified by the amplifier-rectifier and recorded by the recorder 23.

In operation of the system, light to be measured is incident on the Wollaston prism, so oriented that the polarization of one of the two beams exiting from the Wollaston prism will have the polarization of the nominally polarized incident beam. The path of this beam is called the reference path as the intensity in this path is unaffected by small polarization effects. The second beam exiting from the Wollaston prism will contain only light with components of polarization orthogonal to the nominal polarization to the incident beam and, the path of this beam is called the signal path. Since this instrument is intended to measure small amounts of depolarization it will be appreciated that the initial intensity in the reference path may be a million or more times that in the signal path. The light is directed onto the glass wedges which redirect each of the light paths to a common point on the photocathode of the upper photomultiplier tube through separate focusing lens. The light passes through the rotating linear polarizer and the field stop prior to reaching the photocathode of the photomultiplier tube. The signal path is provided with a linear polarizer which eliminates stray light reflections from the reference side and the reference path is provided with an attenuator for cutting the intensity of the light in the reference path beyond the attenuator down to that of the light intensity in the signal path.

The light in the signal path and reference path passes through the rotating linear polarizer which modulates the signal and reference intensities alternately. Since the light in the signal path and reference path are polarized at right angles to each other, there will be no signal difference produced by the photomultiplier tube unless there is a difference in the light intensities. If the light passing through the Wollaston prism does not include any changes in the state of polarization then there will be no signal difference output. However, if there is a change in the polarization, light intensity due to the change will be divided equally between the signal path and the reference path. Since the light intensity of the change is small and the light intensity in the reference path up to the attenuator is large, the effect on the intensity of the light in the reference path will be negligible. However, since the intensity of the light in the signal path is small compared to that of the reference path prior to the attenuator, there will be an additive effect on the intensity of the light in the signal path. Therefore, there will be a difference between the light intensity in the signal path and that of the reference path when passing through the rotating linear polarizer. This light will be incident on the photocathode of the photomultiplier tube thereby producing an alternating output signal from the phototube whose amplitude and phase specify the difference between the reference intensity and the signal intensity. This output signal is directed to the amplifier-rectifier which amplifies the signal and from which the signal is directed to a recorder.

The system is provided with a mirror in optical relationship with the glass wedge in the reference path such that light reflected by the glass wedge is incident on the mirror. The light is reflected by the mirror through the rotating linear polarizer onto a photocathode of the lower positioned phototube. The signal from the lower phototube is directed to the rectifier-amplifier to produce a synchronization signal for the rectifier. The rectifier-amplifier output is a direct analogue of the difference between signal and reference light intensity which is a measure of depolarized light.

If $i$ represents the recorded response to intensity difference at the upper phototube, then the depolarization factor $u$ can be computed from the following formula:

$$u = 2\left[\left(\frac{1-i}{i_r}\right)T_r - T_e\right]$$

where $i_r$ is the recorded response to the reference intensity alone;

$T_r$ is the known transmittance of the reference attenuator; and $T_e$ is the extinction ratio of the Wollaston prism on the signal side. In finding $i_r$, the signal beam may be blocked such that only the reference beam is detected by the upper photo detector and the recorded signal will be due to the reference beam only.

The system may be assembled by use of well-known optical and electrical elements and for detection of depolarization changes less than $10^{18}$ in the Wollaston transmittance at extinction, the reference path attenuator may be a Corning glass filter 05970 with a transmittance of $6.6 \times 10^{18}$ at a wavelength of 633 nm. For larger depolarizations fixed attenuators with larger values of $T_r$ may be used.

Obviously many modifications and variations of the present invention are possible in the light of the above teachings. It is therefore to be understood that within the scope of the appended claims the invention may be practiced otherwise than as specifically described.

I claim:
1. A polarimeter for measuring small changes in the state of polarization of polarized light; which comprises:
   a Wollaston prism;
   said Wollaston prism separating incident linearly polarized light into a reference path with the same polarization as that of the incident beam and a signal path containing any orthogonal component of said incident beam;
   a first photomultiplier tube;
   optical means in said signal path and reference path for redirecting the light in the respective paths onto the photocathode of said photomultiplier tube;
   a light attenuator in said reference path for reducing the intensity of the light in the reference path to a level comparable to that in said signal path;
   a rotating linear polarizer;
   said rotating linear polarizer operative to alternately modulate the light of said reference and signal paths prior to incidence on said photocathode of said photomultiplier tube whereby said photomultiplier produces an alternating component of current corresponding to the incident modulated light;
   a rectifier-amplifier;
   said rectifier-amplifier converting any amplitude difference in said alternating current output of said photomultiplier to a direct current; and
   a recorder for recording any output from said rectifier-amplifier which represents any changes in the state of polarization of said incident light.

2. A polarimeter as claimed in claim 1 which includes:
   a second photomultiplier tube;
   a light-reflecting means positioned relative to said optical means in said reference light path to receive light reflected from said optical means in said reference light path;
   said light-reflecting means reflecting light through said rotating linear polarizer onto the photocathode of said second photomultiplier tube;
   whereby the output of said second photomultiplier tube provides a synchronization signal for said rectifier-amplifier.

3. A polarimeter as claimed in claim 2 wherein the optical means in said signal and reference light paths includes:
   a glass wedge; and
   a focusing lens.

4. A polarimeter as claimed in claim 3 wherein said optical means in said signal light path includes a linear polarizer to block light reflected back.

5. A polarimeter as claimed in claim 4 which includes a field stop positioned between said rotating linear polarizer and said first and second photomultiplier tubes in each of the light paths to each of said photomultiplier tubes.